United States Patent
Spesser

(10) Patent No.: US 10,099,564 B2
(45) Date of Patent: Oct. 16, 2018

(54) ON-BOARD CHARGER FOR AN ELECTRICALLY DRIVEN VEHICLE, MANUFACTURING METHOD FOR SAME AND VEHICLE HAVING SUCH AN ON-BOARD CHARGER

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing h.c. F. Porsche Aktiengesellschaft, Stuttgart (DE)

( * ) Notice: Subject to any disclaimer, the term of this patent is extended or adjusted under 35 U.S.C. 154(b) by 107 days.

(21) Appl. No.: 15/219,724

(22) Filed: Jul. 26, 2016

(65) Prior Publication Data

US 2017/0028858 A1 Feb. 2, 2017

(30) Foreign Application Priority Data

Jul. 28, 2015 (DE) .......... 10 2015 112 247

(51) Int. Cl.
  *H02J 7/00* (2006.01)
  *B60L 11/18* (2006.01)
  *B60L 3/00* (2006.01)

(52) U.S. Cl.
  CPC ......... *B60L 11/1809* (2013.01); *B60L 3/0023* (2013.01); *B60L 11/1812* (2013.01); *B60L 11/1818* (2013.01); *B60L 11/1861* (2013.01); *H02J 7/0027* (2013.01); *B60L 2210/42* (2013.01); *B60L 2240/36* (2013.01);
  (Continued)

(58) Field of Classification Search
  USPC ........................................ 320/107, 108, 109
  See application file for complete search history.

(56) References Cited

U.S. PATENT DOCUMENTS 8,616,909 B2 * 12/2013 Kurumizawa .......... E05B 83/00
                                                            320/109
2004/0100225 A1   5/2004 Neil
2009/0139740 A1   6/2009 Lindsey
                        (Continued)

FOREIGN PATENT DOCUMENTS

DE        10003924     8/2001
DE        10054324     5/2002
                  (Continued)

OTHER PUBLICATIONS

Japanese Office Action with English language translation for Application No. 2016-145209, dated May 17, 2017, 7 pages.
(Continued)

*Primary Examiner* — Brian Ngo
(74) *Attorney, Agent, or Firm* — RatnerPrestia

(57) ABSTRACT

An on-board charger for an electrically driven vehicle having (i) at least one connector for connecting a plug, the connector including a seal for sealing the connector; and (ii) an edge, running around the connector, for protecting the seal against sprayed water. A method for manufacturing the on-board charger includes the steps of injection molding a housing of the on-board charger, and integrally injection molding the edge onto the housing. A vehicle includes a drive which is supplied with electrical driving energy, a traction battery for storing the driving energy, and the on-board charger for charging the traction battery with the driving energy.

12 Claims, 2 Drawing Sheets

(52) U.S. Cl.
CPC ........ *Y02T 10/7005* (2013.01); *Y02T 10/7072* (2013.01); *Y02T 90/127* (2013.01); *Y02T 90/14* (2013.01)

(56) References Cited

U.S. PATENT DOCUMENTS

| | | | |
|---|---|---|---|
| 2011/0282807 A1 | 11/2011 | Colello | |
| 2012/0193068 A1 | 8/2012 | Nemesh | |
| 2013/0020990 A1* | 1/2013 | DeBoer | B60L 11/1824 320/109 |
| 2013/0224969 A1* | 8/2013 | Sasaki | B60L 11/1818 439/34 |
| 2013/0314034 A1* | 11/2013 | Ang | B60W 20/00 320/107 |
| 2015/0042275 A1* | 2/2015 | Schoener | B60L 11/1816 320/109 |
| 2015/0325948 A1* | 11/2015 | Kurita | H01R 13/5227 439/206 |
| 2016/0059731 A1* | 3/2016 | Jung | B60L 11/1818 320/109 |
| 2016/0107530 A1* | 4/2016 | Roberts | B60L 11/1818 320/109 |

FOREIGN PATENT DOCUMENTS

| | | |
|---|---|---|
| DE | 102013221454 | 5/2015 |
| JP | 07298411 | 11/1995 |
| JP | 2000139030 | 5/2000 |
| JP | 2011103259 A | 5/2011 |
| JP | 2011147261 A | 7/2011 |
| JP | 2013196887 A | 9/2013 |
| JP | 2015015808 A | 1/2015 |
| WO | 2015060112 | 4/2015 |

OTHER PUBLICATIONS

German Search Report for German Application No. 10 2015 112 247.2, dated Apr. 15, 2016 with Partial Translation, 11 Pages.

\* cited by examiner

ON-BOARD CHARGER FOR AN ELECTRICALLY DRIVEN VEHICLE, MANUFACTURING METHOD FOR SAME AND VEHICLE HAVING SUCH AN ON-BOARD CHARGER

CROSS-REFERENCE TO RELATED APPLICATIONS

This application claims priority to German Patent Application No. 10 2015 112 247.2, filed Jul. 28, 2015, which is incorporated by reference herein in its entirety.

FIELD OF THE INVENTION

The present invention relates to an on-board charger for an electrically driven vehicle. The present invention also relates to a corresponding method for manufacturing an on-board charger and to a corresponding vehicle.

BACKGROUND OF THE INVENTION

On-board chargers (OBCs) for electrically operated vehicles are known. Said on-board chargers can be directly connected to the charging socket of the vehicle and serve to convert voltage within the vehicle. An OBC can have various interfaces in connectors (headers) for connecting to various components within the vehicle, which components are mounted on the OBC with screw connections.

JP 2000 139 030 A2 (Akazawa Yasumasa), which is incorporated by reference herein, describes a charging system for an on-board battery of a vehicle. In this context, a supply device, mounted at a position, is to be connected to a connecting device which is mounted on the vehicle, in order to charge the battery.

JP H07 298 411 A2 (Toyota Automatic Loom Works LTD), which is incorporated by reference herein, describes an on-board charger for a motor vehicle which has ventilation openings and a cooler with closable water covers on its sides.

US 2009 0139 740 A1 (Caterpillar Inc.), which is incorporated by reference herein, describes an electric drive system having a plurality of components and electrical connections between them, wherein the connections are closed within the housings of the components and in this way a sealed barrier is generated between the connection and the surroundings.

US 2011 0282 807 A1 (Premium Power Corp.), which is incorporated by reference herein, describes a method for transporting energy between the location of generation and the location of use.

US 2012 0193 068 A1 (GM Global Technology Operations LLC), which is incorporated by reference herein, proposes a cooling device for the components of a vehicle having at least one line and one cooler which blows air through the line to the components to be cooled.

SUMMARY OF THE INVENTION

Described herein is an on-board charger for an electrically driven vehicle, a corresponding method for manufacturing an on-board charger and a vehicle having such an on-board charger.

An advantage of the solution presented herein is the protection of the connector against the ingress of sprayed water. Even when there is a high water pressure, the proposed structural measure is capable of effectively preventing water migrating under the seal and thereby entering the on-board charger.

For this purpose, an edge which is essential to the invention prevents water impinging directly on the edge of the connector.

The edge can therefore have a height which is at most twice a flange height of the connector. The edge which is dimensioned in this way does not impede the connection of a conventional plug to the device.

In one preferred embodiment, the seal of the connector is a lip seal. The insertion forces which have to be applied for installation are relatively small here.

The material recommended for the housing and edge here is, in particular, plastic in order to give the on-board charger numerous technical properties, such as malleability, hardness, elasticity, fracture strength, temperature resistance and heat deflection temperature as well as chemical resistance, which are advantageous during the operation of the vehicle.

Finally, in terms of practical fabrication criteria, it is necessary to consider possible injection molding for molding the housing of the on-board charger, which injection molding directly comprises integrally injection molding the edge onto the housing. The manufacture of the charger in large numbers can therefore be carried out extremely economically.

BRIEF DESCRIPTION OF THE DRAWINGS

An exemplary embodiment of the invention is illustrated in the drawings and will be described in more detail below.

DETAILED DESCRIPTION OF THE INVENTION

Figure 1:
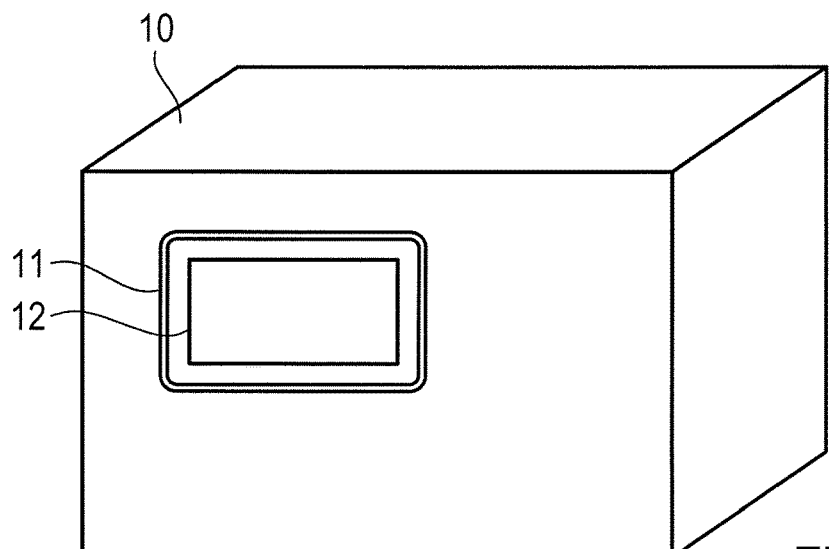
FIG. 1 shows the perspective view of an on-board charger.

FIG. 1 illustrates the proposed structural measure with reference to the inventive on-board charger 10 of an electrically driven vehicle which is equipped with a high-voltage traction battery for storing the electrical driving energy. The electrical interface between the on-board charger 10 and the charging socket, configured for alternating current (AC), of the vehicle is accommodated by a rectangular connector 12 of said on-board charger 10 which is screwed thereto by means of screws. Further connectors (not illustrated in the drawing) accommodate corresponding electrical interfaces between the on-board charger 10 and the traction battery as well as the on-board power system of the vehicle.

Figure 2:
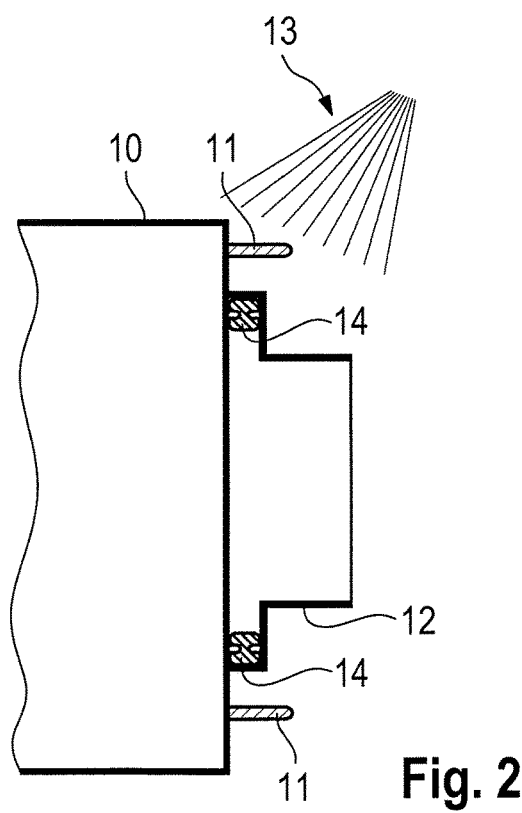
FIG. 2 shows a section through the on-board charger according to FIG. 1.

As is already shown by the perspective view according to FIG. 1, a rounded edge 11, whose anticipated function can be more clearly seen in FIG. 2, runs around the connector 12. The latter sectional illustration shows, in particular, the double lip seal 14 which is provided for sealing the connector 12 and is protected against sprayed water 13 by the edge 11 which is essential to the invention.

Figure 3:
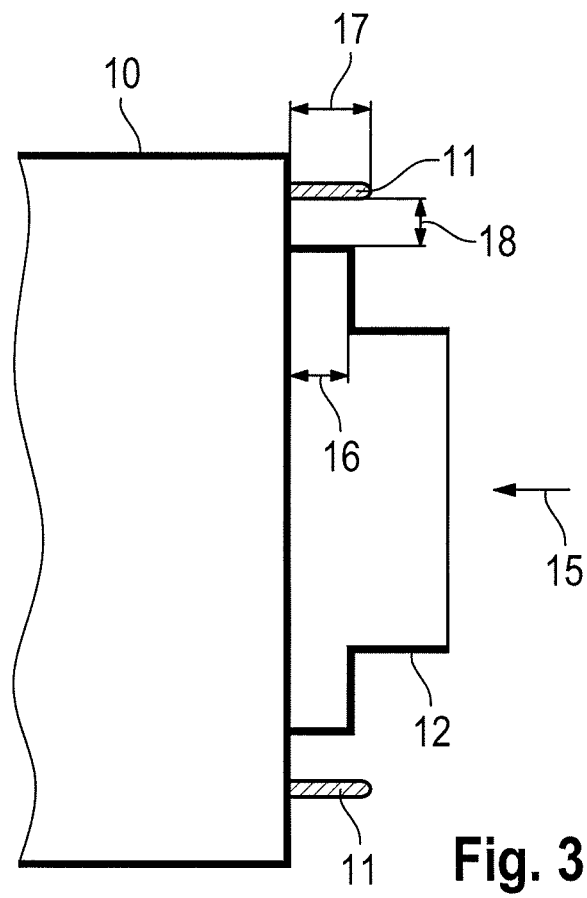
FIG. 3 shows a detailed section through the on-board charger.

FIG. 3 clarifies the geometric properties of the on-board charger 10 with respect to the flange height 16 of its connector 12. Therefore, the edge 11 described above has a height 17 which is at most twice the flange height 16 of the connector 12 and runs around the latter at a distance 18 which is half the flange height 16. The plug 15 which is indicated in the drawing merely by a directional arrow can therefore be introduced into the connector 12 in the customary manner. The plug 15 will bear at least partially on the flange in a seated position of the plug 15.

What is claimed is:

1. An on-board charger for an electrically driven vehicle, comprising:
    a housing having a surface;
    at least one connector extending from the surface of the housing for connecting to a plug, the connector including a flange, and a seal positioned on the flange for sealing the connector, and
    an edge extending from the surface of the housing, the edge running around the connector to surround the seal while being spaced from the seal by a gap,
    wherein the edge has a height which is less than twice a height of the flange of the connector, and a distance between the edge and the connector is less than the flange height,
    wherein the edge is configured for protecting the seal against sprayed water.

2. The on-board charger as claimed in claim 1, wherein the connector further comprises screws for screwing the connector to the on-board charger.

3. The on-board charger as claimed in claim 1, wherein the connector is rectangular and the edge is rounded.

4. The on-board charger as claimed in claim 1, wherein the distance between the edge and the connector is half the flange height.

5. The on-board charger as claimed in claim 1, wherein the charger includes at least one of the following features:
    (a) the connector accommodates an electrical interface between the on-board charger and a charging socket of the vehicle,
    (b) the connector accommodates an electrical interface between the on-board charger and a traction battery or the vehicle, or
    (c) the connector accommodates an electrical interface between the on-board charger and an on-board power system of the vehicle.

6. The on-board charger as claimed in claim 5, wherein the charging socket of the vehicle is an alternating current charging socket.

7. The on-board charger as claimed in claim 1, wherein the seal is a lip seal.

8. The on-board charger as claimed in claim 1, wherein the seal is a double lip seal.

9. The on-board charger as claimed in claim 1, wherein the edge is made of plastic.

10. The on-board charger as claimed in claim 1, wherein the edge is made of thermoplastic.

11. The on-board charger as claimed in claim 1, wherein the housing is injection molded, and the edge is injection molded and integrally formed on the housing.

12. A vehicle comprising: a drive which is supplied with electrical driving energy, a traction battery for storing the driving energy, and the on-board charger as claimed in claim 1 for charging the traction battery with the driving energy.

* * * * *